US010353450B2

(12) United States Patent
Gelonese

(10) Patent No.: US 10,353,450 B2
(45) Date of Patent: Jul. 16, 2019

(54) POWER MONITORING AND CONTROL SYSTEM

(71) Applicant: Embertec Pty Ltd, Dulwich, South Australia (AU)

(72) Inventor: Domenico Gelonese, Dulwich (AU)

(73) Assignee: Embertec Pty Ltd (AU)

( * ) Notice: Subject to any disclaimer, the term of this patent is extended or adjusted under 35 U.S.C. 154(b) by 305 days.

(21) Appl. No.: 15/111,004

(22) PCT Filed: Jan. 12, 2015

(86) PCT No.: PCT/AU2015/000007
§ 371 (c)(1),
(2) Date: Jul. 12, 2016

(87) PCT Pub. No.: WO2015/103668
PCT Pub. Date: Jul. 16, 2015

(65) Prior Publication Data
US 2016/0370834 A1    Dec. 22, 2016

(30) Foreign Application Priority Data

Jan. 13, 2014  (AU) .............................. 2014900092

(51) Int. Cl.
*H04N 5/63*       (2006.01)
*H02J 9/00*       (2006.01)
(Continued)

(52) U.S. Cl.
CPC ............ *G06F 1/266* (2013.01); *G08C 23/04* (2013.01); *H01R 25/003* (2013.01);
(Continued)

(58) Field of Classification Search
CPC ................ H04N 5/63; H04N 21/4408; H04N 21/42204; H04N 21/443; G06F 1/266;
(Continued)

(56) References Cited

U.S. PATENT DOCUMENTS 5,815,297 A     9/1998  Ciciora
7,520,783 B2 *  4/2009  Chou ................... H01R 25/003
                                                    439/652
(Continued)

FOREIGN PATENT DOCUMENTS

CN      201515449 U      6/2010
CN      203368657 U     12/2013
JP      2000175353 A  * 12/1998

OTHER PUBLICATIONS

International Search Report, PCT/AU2015/000007, dated Apr. 7, 2015.

*Primary Examiner* — Dinh T Le
(74) *Attorney, Agent, or Firm* — Craig A. Fieschko, Esq.; Dewitt LLP

(57) ABSTRACT

A standby power controller that is adapted to remove the electric power from the attached devices when an attached television is determined to be not in use. The controller includes a data communication link adapted to provide data communication with a co-located set top box so as to allow the transfer of usage information from the set top box to the standby power controller.

19 Claims, 5 Drawing Sheets

(51) Int. Cl.
*G06F 1/26* (2006.01)
*H01R 25/00* (2006.01)
*G08C 23/04* (2006.01)

(52) U.S. Cl.
CPC .... *G06F 2200/261* (2013.01); *G08C 2201/12* (2013.01); *G08C 2201/51* (2013.01); *Y02D 10/175* (2018.01)

(58) Field of Classification Search
CPC .. G08C 23/04; G08C 2201/51; H01R 25/003; Y02D 10/175; G06C 2201/12
USPC .......................................................... 307/39
See application file for complete search history.

(56) References Cited

U.S. PATENT DOCUMENTS

| | | | |
|---|---|---|---|
| 8,190,940 | B2 | 5/2012 | Gelonese |
| 8,427,006 | B2 | 4/2013 | Gilbert |
| 8,447,541 | B2 | 5/2013 | Rada et al. |
| 8,450,878 | B2 | 5/2013 | Rada et al. |
| D700,579 | S | 3/2014 | Mobbs |
| 8,674,544 | B2 | 3/2014 | Rada et al. |
| 8,963,086 | B2 | 2/2015 | Gelonese et al. |
| D726,107 | S | 4/2015 | Mudge et al. |
| 9,106,099 | B2 | 8/2015 | Gelonese |
| 2005/0212978 | A1* | 9/2005 | Lo .............................. H04N 5/44 348/731 |
| 2008/0030624 | A1 | 2/2008 | Chang |
| 2008/0106148 | A1 | 5/2008 | Gelonese |
| 2009/0091192 | A1 | 4/2009 | Robertson et al. |
| 2009/0150505 | A1* | 6/2009 | Newman ................. H04L 51/36 709/206 |
| 2009/0235107 | A1 | 9/2009 | Gelonese |
| 2010/0187914 | A1 | 7/2010 | Rada et al. |
| 2010/0191487 | A1 | 7/2010 | Rada et al. |
| 2011/0057511 | A1 | 3/2011 | Gilbert |
| 2011/0057518 | A1 | 3/2011 | Gilbert |
| 2011/0148202 | A1 | 6/2011 | Rada et al. |
| 2011/0251807 | A1 | 10/2011 | Rada et al. |
| 2014/0285019 | A1 | 9/2014 | Gelonese |
| 2014/0292289 | A1 | 10/2014 | Gelonese |
| 2014/0310744 | A1* | 10/2014 | Gelonese .......... H04N 21/4436 725/34 |
| 2015/0020098 | A1* | 1/2015 | Matsuda ................ H04N 21/47 725/37 |
| 2015/0039429 | A1 | 2/2015 | Gelonese |
| 2015/0137621 | A1* | 5/2015 | Emby .................... G05B 11/01 307/140 |
| 2015/0256032 | A1 | 9/2015 | Gatto |
| 2015/0338238 | A1 | 11/2015 | Gelonese |
| 2015/0349532 | A1 | 12/2015 | Gelonese |
| 2016/0062440 | A1 | 3/2016 | Gelonese et al. |
| 2016/0099571 | A1 | 4/2016 | Gelonese |

\* cited by examiner

POWER MONITORING AND CONTROL SYSTEM

TECHNICAL FIELD

This invention relates to a standby power controller having data communication capability.

BACKGROUND OF THE INVENTION

The following references to and descriptions of prior proposals or products are not intended to be and are not to be construed as statements or admissions of common general knowledge in the art. In particular, the following prior art discussion does not relate to what is commonly or well known by the person skilled in the art, but may assist in the understanding of the inventive step of the present invention, of which the identification of pertinent prior proposals is but one part.

There is currently world-wide concern about the level of use of electrical energy for both domestic and commercial uses. In part this concern is based on the greenhouse gas production associated with the generation of electrical energy, and the contribution of that greenhouse gas to anthropogenic global warming. There is also a concern for the capital cost involved in building the electricity generating plants and electricity distribution networks required to generate and distribute an increasing amount of electricity.

A significant contributor to the energy use of households is the audio visual equipment including multiple devices such as televisions, television decoders, television recorders and sound equipment now found in virtually all homes.

Efforts have been made to reduce or control the use of energy by television receivers and associated audio visual equipment, in particular with the use of standby power controllers, and these have met with considerable success. However, the advent of cable and satellite television and digital broadcasting, a further device, the so-called set top box, has become commonplace. The power supply needs of this set top box are complex, and not easily discerned by a conventional standby power controller.

DISCLOSURE OF THE INVENTION

Accordingly, in a first aspect this invention provides a standby power controller (SPC) of a type adapted to remove electric power from attached devices when an attached television is determined to be not in use, including a data communication link adapted to provide data communication with a co-located set top box (STB).

In preference the SPC receives data from the STB describing the usage state of a television connected to the STB. The television is, in general, supplied with electric power via the SPC.

Power is supplied to the television via the SPC. The function of the SPC is to reduce power use of the television, and optionally of other connected AV equipment, by acting to cut the electric power supply when the television is not in use.

In preference, the data describing use is derived at least in part from remote control usage detected by the STB, which is use of a remote control that is used to control the television or the STB.

The STB provides a video signal to the television to display broadcast or stored programs to a user.

In preference, the data describing: use is derived at least in part from, reporting the presence or absence of a video signal being sent to the television by the STB.

In preference, the SPC includes a power sensor adapted to sense the power consumption of the television.

In an embodiment, the SPC includes a remote control sensor adapted to sense use of a remote control which is adapted to control the television, or the STB.

In preference, the SPC includes a processor adapted to analyse any one or any combination of the power consumption of the television and the data from either remote control sensor in order to determine a usage state of the television.

In preference, the SPC will operate to remove electric power from the television when the usage state is determined to be active standby.

In preference, when the television is determined not to be in use electric, power is withdrawn from the STB.

It is preferred that the television is not powered down when it is in fact in use. Accordingly, it is preferred that, when the usage state of the television is determined to be active standby, the SPC causes a warning of impending withdrawal of electric power from the television to be displayed on the television screen.

In a further embodiment, the processor is provided by the STB, with remote control usage data being transmitted by the SPC to the STB and the STB commanding the SPC to perform the withdrawal of electric power.

BRIEF DESCRIPTION OF THE DRAWINGS

The invention will now be described with reference to certain non-limiting embodiments in connection with the accompanying drawings in which.

DETAILED DESCRIPTION OF THE DRAWINGS

Figure 1:
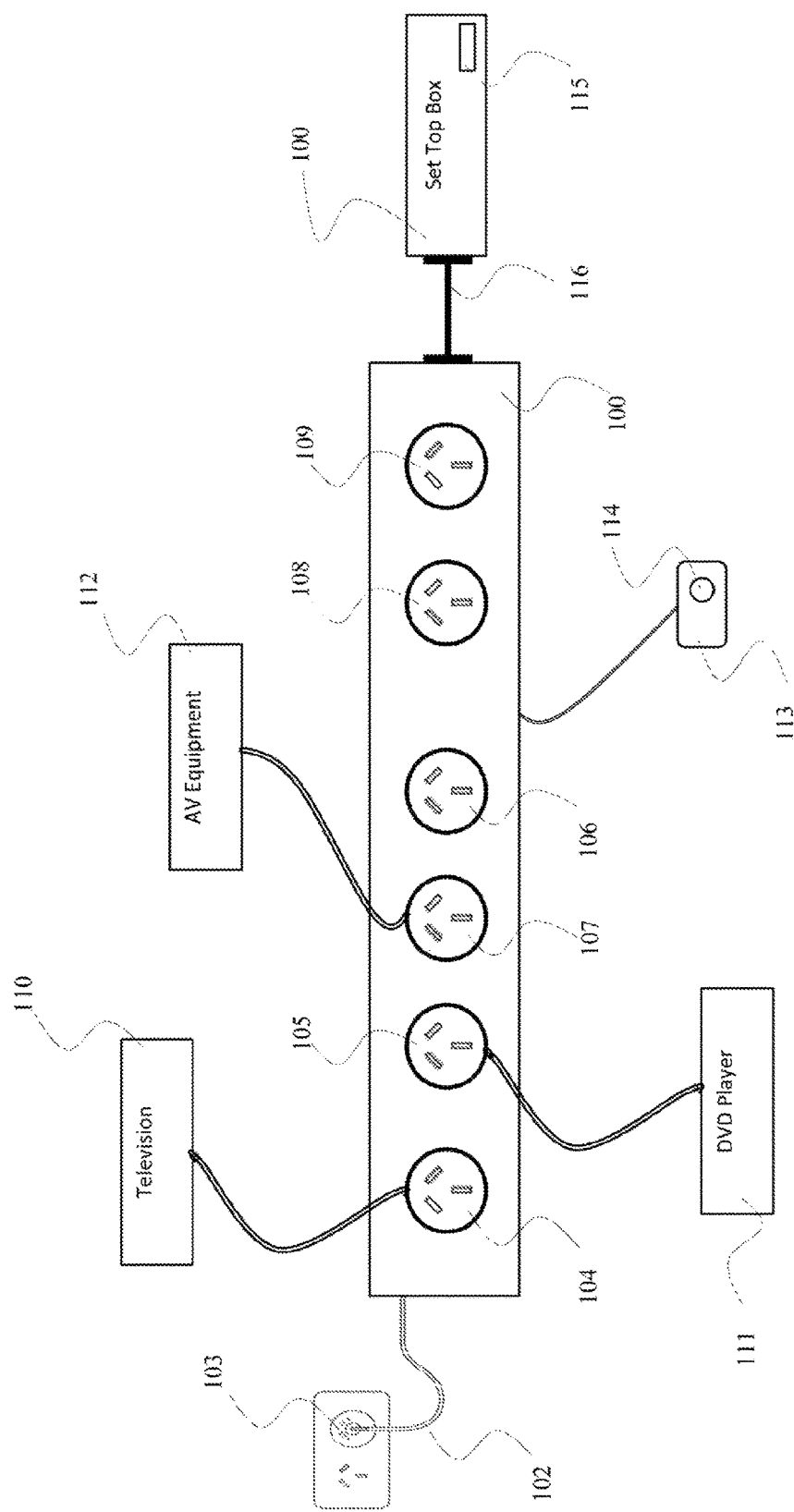
FIG. 1 is a representation of a standby power controller incorporating the invention.

Referring first to FIG. 1, it is to be understood that this is a general representation of an installation including a standby power controller (SPC) including the invention and is illustrative only. It is not intended to limit the number or configuration of continually powered or switched or monitored main outlets, or of communication interfaces or other functional modules.

FIG. 1 shows a representation of an SPC including an embodiment of the current invention. An SPC is a device which controls the flow of electrical power to one or more connected appliances such that when one or more, or a particular one, of the connected appliances enters a low power consumption "standby" state, the electrical power supply to one, all or selected ones of the connected appliances is interrupted.

The SPC 100 receives electrical power from a General Purpose Outlet 103, via power cord 102.

The SPC includes Monitored and Controlled Outlets 104, 105, 106, 107. The SPC also includes Uncontrolled Outlets 108, 109. In general, any number of Monitored and Controlled outlets and Uncontrolled Outlets may be provided. In an embodiment, the Uncontrolled outlet may be absent.

Monitored and Controlled Outlet 104 supplies electrical power to a television 110. Further Monitored and Controlled Outlets 105, 106 may provide electrical power to other audio-visual equipment, for example a DVD player 111 and audio equipment 112. In an embodiment having only one Monitored and Controlled outlet, multiple devices may be powered from the one outlet using a powerstrip. In any embodiment, multiple devices may be powered from one Monitored and Controlled outlet using a powerstrip.

The SPC is in data communication, with a set top box (STB) 101 via data link 116. Data link 116 may be provided by any convenient means. Without limitation, this may be a physical link using, for example, USB protocol or any other suitable protocol, including any proprietary protocol; a dedicated wireless link using, for example, Bluetooth protocol; a wireless link using a wifi link. The data link may also be provided by the SPC and the STB having separate internet connections, with communication occurring over the public internet.

The SPC may include an infra-red sensor 113 for receiving signals from an infra-red remote control.

In order to save energy the STB operates to remove the power supply from Monitored and Controlled outlet 104, and hence from the attached television, whenever the television is detected to not be in use.

Modern television sets and other audio visual equipment, when turned "off" by the remote control, enter a low power "standby" state, in which energy is still consumed, although at a significantly lower level that when the device is nominally "on". When the television is in this standby state it is not in use, and the power supply to it may be cut to save energy.

It is also the case that television sets may be left on for extended periods when no user is viewing the screen. This may happen when a user falls asleep in front of the television, or when a user, particularly a child or a teenager, simply leaves the vicinity of the television without turning the television off. This state may be termed "active standby". In this state the television is not in use, and the power supply to it may be cut to save energy.

The SPC may detect that the television has entered a standbys state by any convenient means, or combination of means.

The SPC may also include a power sensor adapted to sense the power drawn through a Monitored and Controlled outlet. The power sensor detects characteristics of the power flow through the outlet. When the characteristic is such as to indicate that the television is in a standby mode the power to the Monitored and Controlled outlet 104, and hence to the attached television or monitor is interrupted.

The SPC may include any number of Monitored and Controlled outlets, which may be monitored and controlled individually or together.

The SPC may include means to detect that a user is interacting with the STB 101, the audio visual equipment and/or the television. In the illustrated embodiment, the IR sensor 113 receives IR signals from a remote control associated with the television, the STB or other connected AV equipment.

It is likely that a user, when actively watching television, will periodically use the remote control to change channels, adjust volume, mute commercials, etc. Thus a remote control signal receiver, such as IR sensor 113 can be used as a usage sensor. If no remote control activity is detected by the IR sensor 113 for a period, of time, the assumption may be made that the television is not in use, and the power supply to the Monitored and Controlled outlet 104, and hence to the television, is interrupted. This may be achieved by using a countdown timer which starts from a specific initial Value equal to a particular time period, say one hour, and having this countdown time continuously decrement. Each detected use of the remote control will reset the countdown timer to the initial value. When the countdown time reaches zero, there has been no remote control activity for the time period, and the television is assumed to not be in active use and the electricity supply to the Monitored and Controlled outlet 104, and hence to the television is interrupted.

The IR usage detected by the IR sensor 113 may be IR commands directed at the STB, the television, or another connected piece of ACV equipment. The STB may decode the commands, but this is not necessary. The SPC may detect any IR remote control usage and use this to infer that a user is present and, interacting with the AV equipment.

In many cases the only signal to be displayed by the television 110 will be the video signal from the STB 101. In this case, should the STB not be sending a video signal to the television for display, it will be the case that the television is not in use and the electricity supply to the television may be interrupted to save energy.

The STB 101 is adapted to communicate with the SPC 100 via communications link 116. This communication allows the SPC to determine when the television is not in use, and the electricity supply to the television may be interrupted to save energy.

Communication between the STB and SPC may be controlled by either or both devices. The STB may communicate the status of use of the television to the SPC. In addition, or alternatively, the SPC may determine that the television is not in use when the STB does not communicate, and hence it may be assumed that the STB is itself in a standby or off state.

The STB is equipped with an IR remote control sensor. Detection of IR by this sensor may be communicated to the SPC. This detection information may be used by the SPC in the same way as detection of IR by remote control sensor 111. In an embodiment, remote control sensor 113 may be absent. The STB may communicate only detection of use of the remote control associated with the STB, or the STB may communicate detection of the use of any remote control.

In an embodiment, the STB may determine when the television is not in use, by a combination of remote control detection and the video signal sent to the television. The STB may also be adapted to determine the power state of the television by direct communication with the television. The STB may provide to the SPC a single signal, indicating that power to the television should be removed or maintained. This may be provided by any protocol or convenient means. The signal may be a single high or low logic level, communicated by direct wired connection between the STB and the SPC.

It is possible that other devices in addition to the STB may be connected to the television, and use the television, to display content. Such devices would include DVD players and VCRs. Should these devices be in use, the television is likely to be in use, and the power supply to the television should not be interrupted. Further, in some cases, the television remote control may be separate from the STB remote control. Functions such as volume may be controlled only or additionally from the television remote control. Further, the television may have signal inputs independent of the STB, and may be used independently of the STB. Accordingly, in an embodiment, the IR sensor is able to detect IR signals from remote controls other than the remote control which is used to control the STB. These may be remote controls for any device which requires the television to be on when the device is in use. The IR signals will serve to reset the countdown timer such that the power to the television is not interrupted.

It may be sufficient to determine that a user is present in the vicinity of the television in order to decide that the television should not be turned off. Any suitable sensor may be used for determining that a user is present and thus that power to the television should not be interrupted. These include, without limitation, passive IR sensors, ultrasonic sensors, cameras, any other passive or active movement sensors, and sound detectors.

Whatever means is used to determine that the television is on, but not in use, it is unlikely to be completely free of false positives, that is, determining that the television is in active standby and not in use when the television is in fact in use. If the television is turned off when a user is still watching a program, the user will be irritated. Repeated occurrences are likely to lead to the power control function of the SPC being bypassed, preventing power savings.

The SPC includes a warning LED 114. When the SPC determines that the television is in active standby, the warning LED will flash to alert any user to the imminent shutdown of the power to the television. In the case where there is a false positive, that is, there is a user watching the television, the user may react to observing the flashing of the warning LED by pressing a key on the remote control. The IR signal from the remote control is detected by the IR sensor 113, or by the IR sensor 115 in the STB, and the countdown timer is reset, preventing the power to the television being interrupted.

Other methods for warning of imminent shutdown of power to the television may be used. An audible warning tone may sound.

In a preferred embodiment, the SPC is adapted to communicate a warning of imminent shutdown to the STB via communications link 116. A message indicating imminent shutdown, and optionally advising a user what action to take to avoid the shutdown, may be displayed on the television. This is possible because the STB controls the video signal being displayed by the television. The warning message may be displayed by interrupting the television program, or by superimposing the message over the image being played.

When a determination is made that the television is in a standby or active standby, the supply of electricity to the television is removed, thus saving energy which would otherwise be used by the television in these standby states. When a user again wishes to use the television, the remote control, which may be associated with the television of the STB, is operated.

Operation of the remote control is detected by one or both of the IR sensors. Power is returned to the controlled outlets. The television is powered up. The television may power up in a standby mode, in which case, a further use of the remote control is required to bring the television to a fully operating state.

Uncontrolled power outlets 108, 109 are optionally provided to allow for power to be supplied to devices which should not have the power supply cut when the television is not in use. This outlet supplies power at all times when the SPC is plugged in. Any number of uncontrolled outlets may be provided.

Devices other than a television may be connected along with a television to the Monitored and Controlled outlets. In this case, the total load of all devices will be monitored for the characteristics indicating that all devices so connected are in a standby or unused state.

A third type of power outlet (not shown) may be provided. This non-monitored, controlled outlet is not monitored by the power sensor, so the power drawn by any load connected to the outlet does not contribute to the determination that the monitored load is in a standby or unused state. This outlet is controlled. When power is interrupted to the monitored, controlled outlets, power is also interrupted to this outlet.

In further embodiments, power to the STB is provided by one of the Monitored and Controlled outlets. This may be a dedicated STB Power outlet, which is able to be switched separately from any other controlled outlets. In such embodiments, use of a remote control by a user to turn on the television or the STB is detected by IR sensor 113, since IR sensor 115 on STB will not have power.

Figure 2:
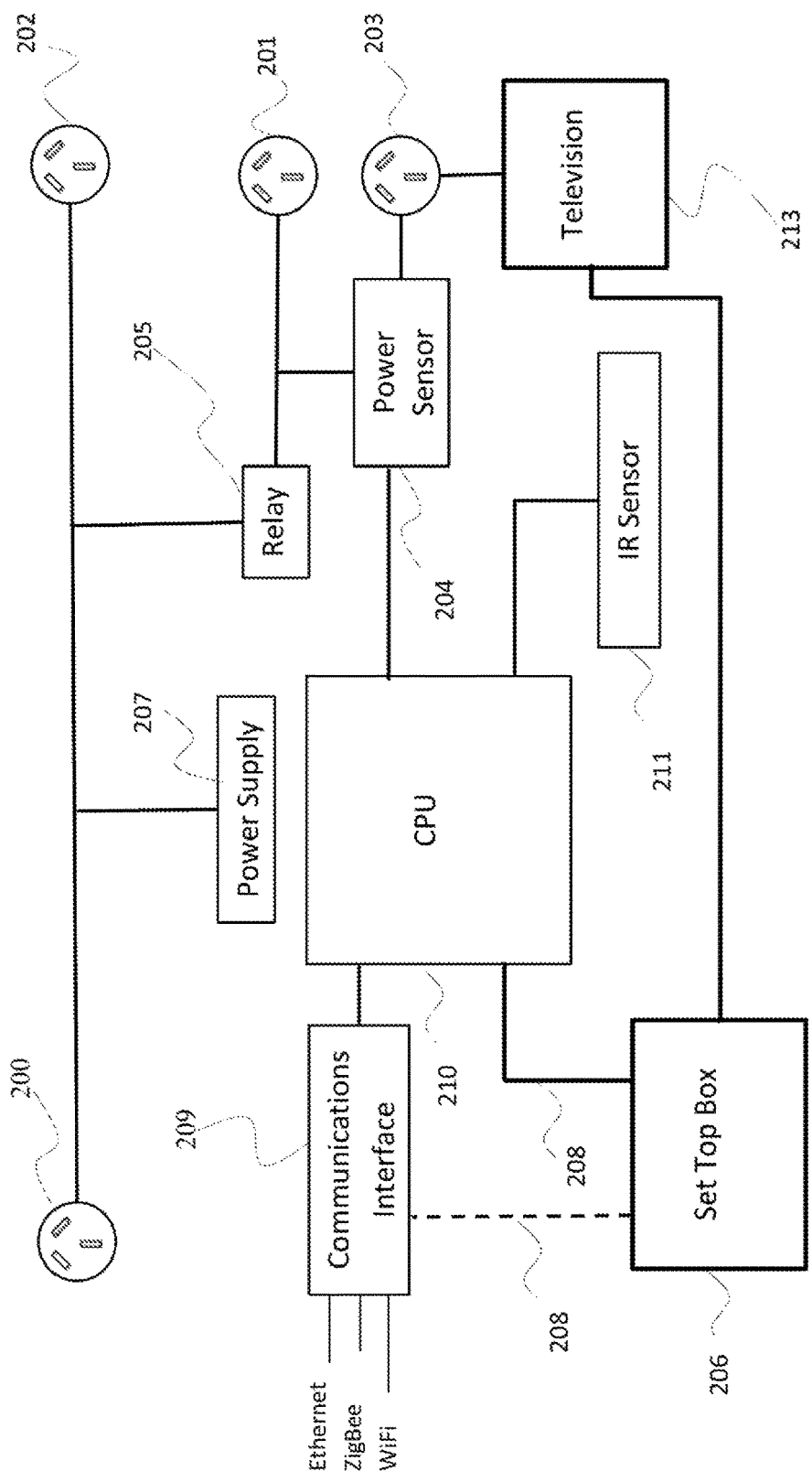
FIG. 2 is a functional block diagram of a standby power controller incorporating the invention.

FIG. 2 shows a block diagram representation of an SPC incorporating the invention.

Mains power is supplied to the SPC via plug connection 200. Power is supplied directly to power supply 207, which provides power for the electronic components of the SPC. Power is also supplied directly to Always On outlet 202, which is a convenient place to plug in items of equipment requiring uncontrolled access to power. Power is also provided to Controlled outlet 201 and to Monitored and Controlled outlet 203. The supply of power to these outlets is controlled by relay 205. The characteristics of the power drawn through the monitored outlet 203 are monitored by power sensor 204. Monitored and Controlled outlet 203 provides power to monitored AV equipment, in this case television 213.

There is also provided Communication Interface 209 for two way data communication with the SPC. Any suitable data communication means may be provided for, including without limitation, ZigBee, Bluetooth, wired ethernet, wi-fi and power line communication. The Communication Interface transmits and receives data communication to and from CPU 210.

The SPC is in data communication with an STB 206, via data interface 208. This may be provided by direct communication between the STB and the CPU. Alternatively, Data Interface 208 may be provided via Communications Interface 209, via ethernet, wifi, ZigBee, or any other protocol supported by the Communications Interface and the STB. The STB provides a video signal to television 213.

There may be provided IR Sensor 211, able to detect usage of infra-red remote control devices. Detection of IR activity may also be performed by the STB, and this information communicated to the STB.

In an embodiment, some or all of the communication functionality of the Communication Interface 209 is provided by the STB, with data being communicated to the SPC CPU 210 via data interface 208.

In use the SPC operates to provide power to the television. The power sensor monitors the power drawn by the television. The power sensor may monitor the current drawn through the Monitored and Controlled Outlet, or both current and voltage may be monitored. Phase angle may also be monitored.

The monitored power draw is used to determine the power state of the television. In an embodiment, a significant drop in the magnitude of the power draw is used to determine that a low power standby mode has been entered. Other characteristics of the power use may be used to determine that the television is not in use. This may be the presence, absence or a defined pattern of small fluctuations of the power draw.

When a determination is made that the television is in a standby state, power to both of the controlled outlets 201, 203 is interrupted by the operation of relays 205. Power to the Always On outlet 202 is maintained.

The CPU receives data from the IR Sensor and from the STB indicating use of any IR remote control.

The CPU determines when no IR activity has been detected for a predetermined period. When this occurs, the CPU flashes the warning LED or provides another warning that the television is about to be shut down. If no IR activity is detected in response to the warning, the power to the television is interrupted.

The CPU continues to monitor IR activity. When IR activity is detected, power is returned to the Controlled and to the Monitored and Controlled outlets, and thus power is restored to the television.

In the case where the power to the television is in the interrupted state, the SPC will return power to the television when IR is detected. In an alternative embodiment, the SPC may require that the received IR signal is identified as an "ON" command for the television before returning power to the television. This reduces "false positives" where the SPC reacts to an IR source which is other than the user attempting to turn the television on.

The CPU may be programmed to keep track of the power consumption of the monitored load, both when the load is using full power and when it is in a low power standby state. Information concerning the number of times the power to the load is interrupted may be recorded. Whether the power was interrupted because the television was in a low power standby mode, or because the television was determined to not be in use may also be recorded. This data may be used to calculate or estimate the energy savings achieved by the SPC. This information may be transmitted via the communication interface to an external party such as an energy retailer. The information may also be displayed to a user via an external user interface.

Figure 3:
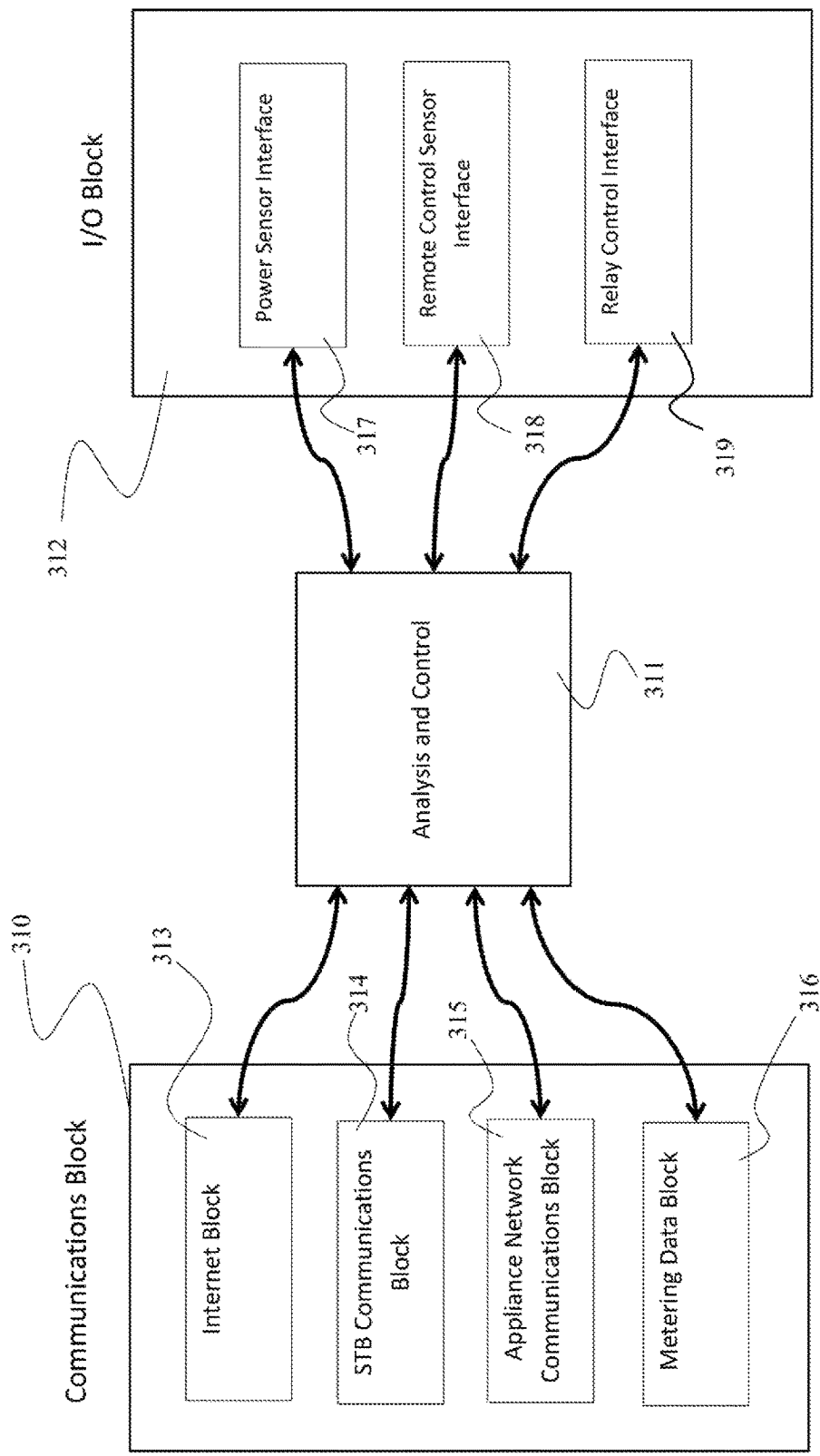
FIG. 3 is a block diagram of the I/O function of a standby power controller incorporating the invention.

FIG. 3 shows a functional block diagram of the SPC of FIG. 2.

There is an Analysis and Control Block 311, which performs energy usage analysis and control determinations.

There is a Communication Block 310 which provides data communication functionality and an I/O Block 312 which provides control and sensor interfaces.

There is an Internet Block 313 which, provides a connection to the internet for the SPC. The physical connection for the internet may be provided in any convenient manner. Without the connection may be provided by wi-fi connection to an existing household router. Internet connection may be provided by direct connection to the data service offered by a mobile telephony network. Direct wired access to an existing router, cable connection box or incoming data line connection may be provided. The internet connection may also be provided by connection to an STB which has an existing internet connection.

Communication with an STB is provided by STB Communications Block 314. The physical connection to the STB may be via any convenient means. Without limitation, the STB may be connected via a wifi connection or a direct wired data communications link. A USB connection may be provided. As discussed above, the STB may provide access to the internet for the SPC, with the Internet Block being in direct communication with the STB Communications Block 314. Alternatively, communications with the STB may be provided by the public internet, with STB Communications Block 314 communicating directly with Internet Block 313. In this case, Internet Block 313 will have access to the interact by means other than via the STB Communications Block 314.

The International Application PCT/AU2013/000236 which is hereby incorporated in its entirety by reference includes a description of a hub device. The functions of a hub may he incorporated into an SPC embodying the current invention.

In an embodiment the SPC includes Appliance Network Communications Block 315. The Appliance Network Communications Block 315 allows the SPC to communicate with corresponding communications means in or associated with appliances in the consumer premises, forming an Appliance Area Network (AAN). The SPC Appliance Network Communications Block 315 may provide physical connectivity using any convenient means. Without limitation, this may include ZigBee protocol capability. ZigBee is a protocol widely used for communication with electrical appliances.

Each of the discretionary use appliances includes, or is associated with, a Communications and Control Module (CCM). This CCM includes a transceiver able to communicate with the SPC, and means to control, at least in part, the power consumption of the appliance. The nature of this control will be dependent on the nature of the appliance. For appliances such as pool pumps, only simple on/off control may be available. For HVAC equipment, the ability to control a thermostat setting may be included. Where the HVAC equipment has zone controls, these may also be available to the CCM. The CCM is able to communicate the state of the controls to which it has access, to the SPC, and to receive instructions from the SPC to change the state of those controls. The CCM is also able to determine, and to communicate to the SPC, the current power usage of the controlled device.

The user interface of the SPC, includes functions allowing the consumer to control the hub functionality of the SPC. The SPC is able to identify, or have identified to it by a user, all of the discretionary use appliances which it is able to control. This includes the nature of the available control in each case, and the power consumption characteristics of the appliance.

In an embodiment, the SPC includes the functionality of an In Home Display (IHD). At its simplest, an IHD displays the current usage of electrical energy by a household to the householder. The Communications Block may include Metering Data Block 316, which receives metering data from an external metering device. The external metering device may be a Smartmeter, which is a device installed by the supplier of electricity to the premises to collect metering data for communication to the electricity supplier for billing purposes, which may also have the capability to communicate the data to a householder. Alternatively, the external metering device may be a device installed independently of the electricity supplier which monitors the electricity supplied to the household. Such a device may include current clamps placed around the main incoming electricity conductors of the premises to measure current flow to the premises.

Commonly, an IHD will also display the cost of this usage. This information may be used by the householder to modify their electricity usage to minimize costs. Any of the capabilities of the Communications Block 310 may be used to communicate energy usage and cost to a user.

The communication and control capabilities of the SPC make it suitable for use in adaptive energy saving systems where broader environmental information is used to decide how to control the electricity supply to an appliance. The SPC provides data about the operation of devices connected to the SPC, and also about the broader electricity usage of the household to an external party or system. That external party or system may then provide instructions to the SPC as to when electricity supply should be provided to or withdrawn from the controlled outlets.

This communication and control capability allows the SPC to form part of a demand response system where electricity usage can be reduced in times of high demand or high costs. The SPC may perform the function of a hub device, communicating usage data from connected devices, from the metering data, and from the appliance network.

The SPC is then able to receive information and instructions from an external source which the SPC can use to control directly connected devices, or other devices via the appliance network.

The SPC may be able to connect, via the Communications Block 310, to an Offer Aggregation Module (OAM), which is controlled by an aggregator.

An energy retailer is also in communication with the OAM. The energy retailer sources the electricity which the consumer, and all of the other customers of the retailer, require from electricity generators via an electricity market, which may take a number of forms.

For technical, commercial and political reasons, it is not generally possible for the energy retailer to implement a price regime where there is a direct, or even an approximate, relationship between the marginal cost per kWh paid by an energy retailer at a given time and the amount being paid by the consumer using that marginal kWh. Thus the wholesale price being paid by the energy retailer for the electricity is for the most part either significantly less than, or very much more than, the price which the consumer is charged for that electricity. This means there is a benefit to the retailer in changing the amount of electricity consumed at a given instant by its customer base. In particular, there is a significant benefit to the retailer in reducing energy consumption at peak times when the retailer is paying far more per kWh than it is able to charge its customers. There is also some benefit in increasing the amount of electricity the retailer is able to sell to its customers at times of low demand, when the retailer is able to buy electricity at prices far below the price charged to the consumer.

The aggregator, via the OAM, facilitates transactions which provide, at least in part, a direct relationship between the cost paid by the energy retailer and the net cost of electricity to the consumer.

When the energy retailer believes that a reduction in consumption of a particular amount would increase the return to the energy retailer, the energy retailer formulates a price offer which is communicated to the OAM. At its most basic, the price offer is an offer of something of value to the consumer in return for a given reduction in electricity consumption for a given period. The value may be in any form including but not limited to reductions in price for electricity for the given period or some other period; direct money payments or bill reductions; goods, discounts on goods or vouchers for goods; services, discounts on services or vouchers for services; loyalty points redeemable for value; any other offer which may be of value. Thus there is an offered price, in return for a required consumption change.

When the SPC is installed in the consumer premises and/or at any later stage, the consumer interacts with the SPC to indicate what offer the consumer would accept to allow a particular control of the discretionary use appliances, and what limitations would be placed on that. These specifications are termed consumption offers.

For example, the consumer might indicate that any offer would be accepted to allow the pool pump to be turned off, so long as the pump would still run for a minimum specified number of hours for that day. Another specification might be that the air conditioning thermostat may be set one degree higher for a small discount offer, but up to five degrees higher for a large discount offer, but no change would be undertaken for any offer which is not money based. A further specification might be that for a still higher cash rebate, the air conditioner may be turned off, possibly with a limitation that this can only occur if the current temperature is less than a set value.

These consumption offers are communicated to the OAM. The OAM or the SPC calculates the reduction in consumption which will occur if the particular consumption offer is taken up. This consumption reduction is recorded as part of the consumption offer. Consumption offers from all consumers who are customers of a particular energy retailer are aggregated by the OAM. This may be done for multiple energy retailers who have access to the OAM.

When the energy retailer issues a price offer, the OAM examines all of the consumption offers which it has received to determine which will be triggered by the price offer, that is those which have a price requirement less than the price offer. The OAM accumulates the consumption offers, adding the consumption reductions until there is a sufficient reduction to meet the requirements of the price offer. This is the aggregate consumption offer.

When a match is achieved, the OAM communicates acceptance of the price offer to the energy retailer and to a device having hub functionality at the premises of each consumer whose consumption offer has contributed to the aggregate consumption offer.

The hub device, which may be the SPC of the invention, at the premises of a consumer whose consumption offer was included in the aggregate consumption offer commands the CCM of each appliance included in the offer to undertake the required action to turn off appliances, reduce thermostat settings or such other activities as were included in the offer.

The hub device then monitors the reduction in power use by each of the affected appliances, for the period of time required by the price offer. Compliance or otherwise with the promised reduction in consumption is then reported to the OAM.

The OAM monitors the information returned by each of the hubs to ensure that the consumption reduction included in the aggregate consumption is achieved. This is reported to the energy retailer. When the energy retailer is satisfied that the terms of the price offer have been met, the energy retailer makes available the promised value. Depending on the nature of the value, the energy retailer may provide the value to the participating consumers directly, or may provide it to the aggregator for distribution to the participating consumers.

An aggregate consumption offer may include consumption offers having different price requirements, up to the price of the price offer. This means that some consumers who participate in the accepted offer may not have required the full value of the price offer to participate. The value distributed to a particular participant may be the price requirement set by that particular participant, or the value distributed may be the same for all participants.

Although the description has been of an offer requiring consumption decreases, the price offer may be for a consumption increase. The process would proceed in the same manner, but the outcome would be an increase in consumption. Examples of appliances which might be turned on to increase demand would be storage water or space heaters, or pool pumps which had not yet run for the required hours for the day.

In an embodiment the CCM for a particular discretionary use appliance may be integrated into the appliance at manufacture. The SPC may include protocols necessary to communicate with the integrated CCM, or the SPC may be able to be programmed in the field, including by the CCM, to include the necessary communications protocols. In the illustrated embodiments, the SPC includes the CCM functionality for the television and other connected AV equipment, which is directly controlled by the CPU.

In an embodiment, the CCM may be completely separate from the controlled appliance and may control it by controlling the power supply to the appliance. The CCM is incorporated into a plug device which is plugged between the device and the GPO (general power outlet) to which the appliance is connected. The CCM monitors the power being drawn from the GPO, and controls the device, on command from the SPC, by cutting off the power supply from the GPO.

The SPC also includes an I/O Block 312. This I/O Block 312 includes the interfaces for the sensing and relay control functions of the SPC.

There is a Power Sensor Interface 317 which provides information concerning the power usage of devices connected to the SPC. Physical power sensors may be provided by any convenient means. In a preferred embodiment, the power sensors sense true RMS power.

The Power Sensor Interface 317 provides the Analysis and Control Block 311 with data concerning the power consumption of the monitored power outlets. This data may be provided for each monitored outlet individually, or it may be the aggregate of the power consumption for all monitored outlets.

There may be provided a Remote Control Sensor Interface 318. This provides data to the Analysis and Control Block 311 concerning the use of remote control devices associated with equipment powered through the SPC and/or which control the STB. The physical sensors associated with the Remote Control Sensor Interface 318 may be without limitation infra-red sensors or RF sensors. The Remote Control Sensor Interface 318 or the Analysis and Control Block 311 may be adapted to decode signals from the remote control devices to determine what control function is being commanded by the user, or may simply detect that a remote control device has been used.

The Analysis and Control Block 311 uses information from the I/O Block and the STB Communications Block 314 to determine when the connected television or other AV equipment is in a low power standby state or an Active Standby state. When such a determination is made the supply of electricity to one or more or all of the controlled outlets is interrupted. Relay Control Interface 319 receives commands from the Analysis and Control Block 311 and causes one or more relays to operate to bring about the required power interruption.

In an embodiment where the video signal protocol used to communicate the video signal to the television (such as HDMI) supports a command, which will hereafter be referred to as the TV Standby command, to put the television or other monitor into a standby mode, an alternative energy saving is possible.

When the SPC makes a determination that the television is in an Active Standby state and that electricity supply to the television is to be interrupted, this interruption may be achieved in a two step process. The SPC sends a request to the STB to put the television into a Standby power state. The STB then issues the TV Standby command to the television via the video signal (eg HDMI) link. This change of power state by the television is detected by the power sensor in the SPC and the electricity supply to the television interrupted in response to this detection. This has the advantage that the television, is not subjected to an unexpected power interruption. Some television sets may include processing and data storage components which may be adversely affected by unexpected power interruption. Providing the TV Standby command allows the television to shut down gracefully and enter a standby state prior to removal of the electricity supply.

A further refinement is available when the video signal protocol is able to control the standby state of the television. In the case where the SPC has interrupted power to the television, the user will normally be required to initiate two IR signals to turn the television on. The first will cause the SPC to return power to the television, which will cause the television to be powered, but in most cases it will be in standby mode. The user must then send a further IR signal from the remote control in order to wake the television from standby. Where the power state of the television can be controlled via the video signal connection, the SPC, after returning power to the television, will send a command to the STB via the data connection requesting the STB to activate the television. The STB will then send a command via the video signal connection to the television, causing it to enter the Fully ON state.

Figure 4:
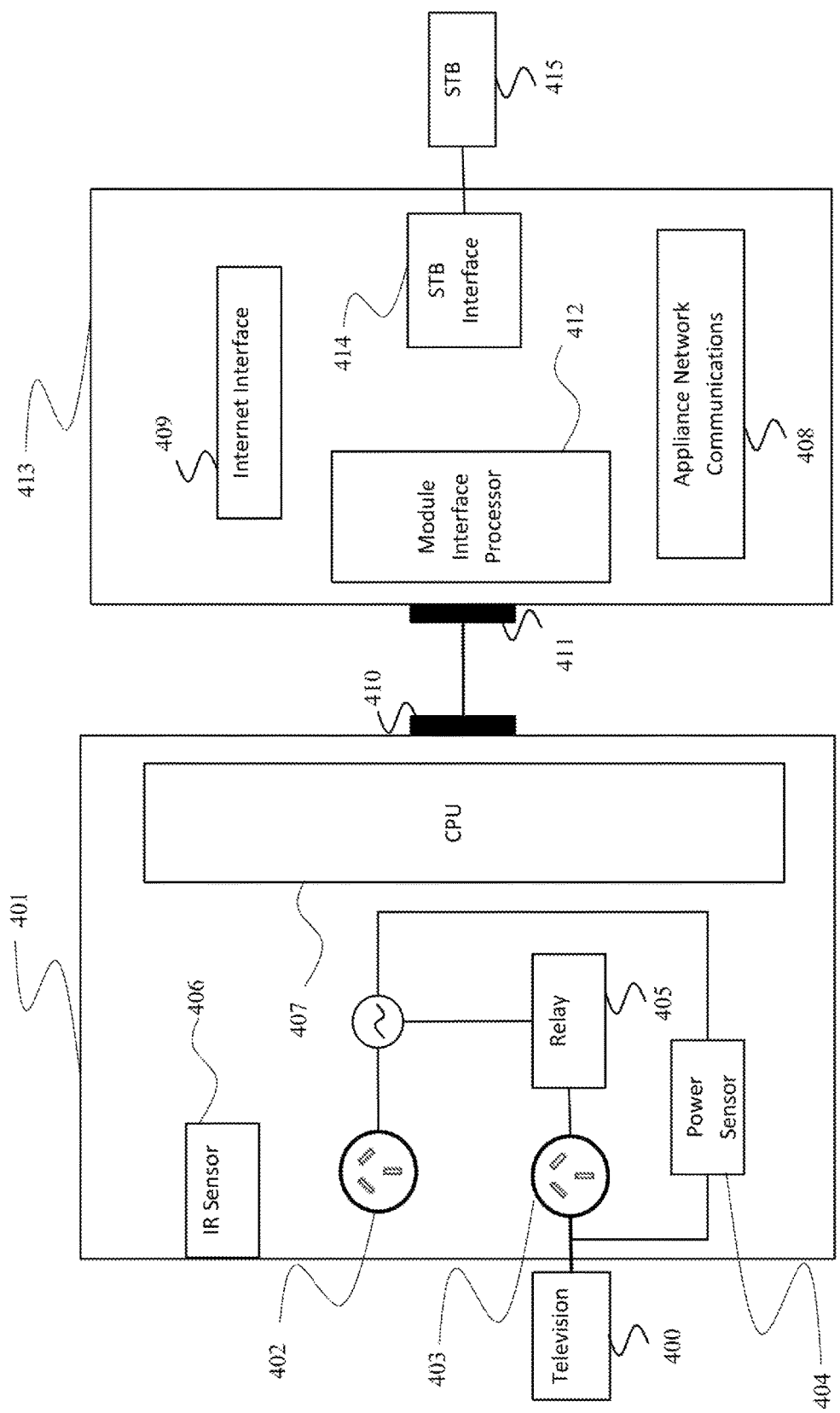
FIG. 4 is a block diagram representation of an embodiment of the current invention including physically separable modules.

Referring now to FIG. 4, there is shown an embodiment of the invention wherein the SPC is provided in connectable physical modules.

The installation of SPCs in residential premises is often financed by third parties who have an interest in energy savings. The third party may be a government body wishing to reduce energy usage in order to reduce needed investment in power supply and/or distribution infrastructure. The third party may be an energy market participant with an imposed requirement to undertake energy saving activities, usually in order to reduce needed investment in power supply and/or distribution infrastructure. Other third party payment scenarios are possible.

In such cases, the third party payer wishes the SPC to be as inexpensive as possible, and will often be unwilling to pay for additional functionality such as STB communication or hub functionality. However, either the householder, or another third party may be prepared to pay for such functionality at a later time or in different circumstances.

The third party payer may also have requirements for low power consumption by the SPC which may be difficult to meet with a fully functioned SPC including hub and STB communication functions.

Therefore the SPC of FIG. 4 is provided in at least two modules which may be plug connected. There is provided a basic SPC module 401, which provides basic power sensing and electricity outlet control. At a minimum, the functions of the I/O Block 312 of FIG. 3 will be provided by this module.

SPC Module 401 may include Uncontrolled Outlet 402, which provided electrical power at all times when the SPC is plugged in. There is provided Controlled Outlet 403, where the electricity supply to this Controlled Outlet 403 is controlled by rely 405. The power drawn through Controlled Outlet 403 and optionally Uncontrolled Outlet 402 is monitored by power sensor 404.

There is provided an IR sensor 406 which detects usage of IR remote control devices. In the illustrated embodiment, this is provided in basic SPC module 401. In other embodiments, the IP sensor may be provided in STB and Hub Module 413 or as part of the STB 415.

The data from power sensor 404 and IR sensor 406 are provided to CPU 407. The CPU analyses this data to determine when the devices connected to the Controlled Outlet 403 such as television 400 are in a low power standby state or an Active Standby state. When such a determination is made, the CPU commands relay 405 to remove the electricity supply from the Controlled Outlet 403.

In other embodiments, the CPU 407 may be located in the STB and Hub Module 401. In this case, a processor providing relay control and communications to the STB and Hub Module is provided within the SPC Module 401.

The SPC Module 401 further includes module connector 410. This allows connection to STB and Hub Module 413. A module connector 411 is provided on the STB and Hub Module 41.3 which is adapted to connect to the module connector 410 on the SPC Module, The STB and Hub Module 413 includes a Module Interface Processor 412 which controls communications with other modules. This processor may also include Analysis and Control functionality appropriate to the STB communications and hub functionality provided by the module. Alternatively, all analysis and control functions may be performed by the CPU 407 in the SPC Module.

STB and Hub Module 413 provides functionality for communication with an external STB 415, via STB Interface 414. This permits data communication between the SPC Module CPU 407 and the STB 415. Data provided to the SPC may include remote control use, power status, and status of a video link to a television which is provided with electricity by Controlled Outlet 403. This data, combined with data from the Power Sensor 404 and optionally IR Sensor 406 allows the SPC Module to determine when the television is in a low power standby mode, or an Active Standby mode, wherein electricity supply to the television may be removed to save energy.

The STB and Hub Module 413 may also include Appliance Network Communications Block 408, and Internet Block 409, which provide functionality as described for the same blocks illustrated in FIG. 3.

In an embodiment (not shown) the Communications Module may be implemented as two or more physical modules which plug together, or which are separately plug connectable to the SPC Module. This allows further flexibility in the provision of the SPC capabilities. For example, an STB Module may include the STB Interface, while a Hub Module includes the Appliance Network Communications and the Internet Interface. The modules may each include a processor to provide Analysis and Control for the particular function performed by the module. Alternatively, Analysis and Control functions may be limited to the main SPC Module. In general, functionality and processing capability may be distributed across connectable modules in any convenient fashion.

Figure 5:
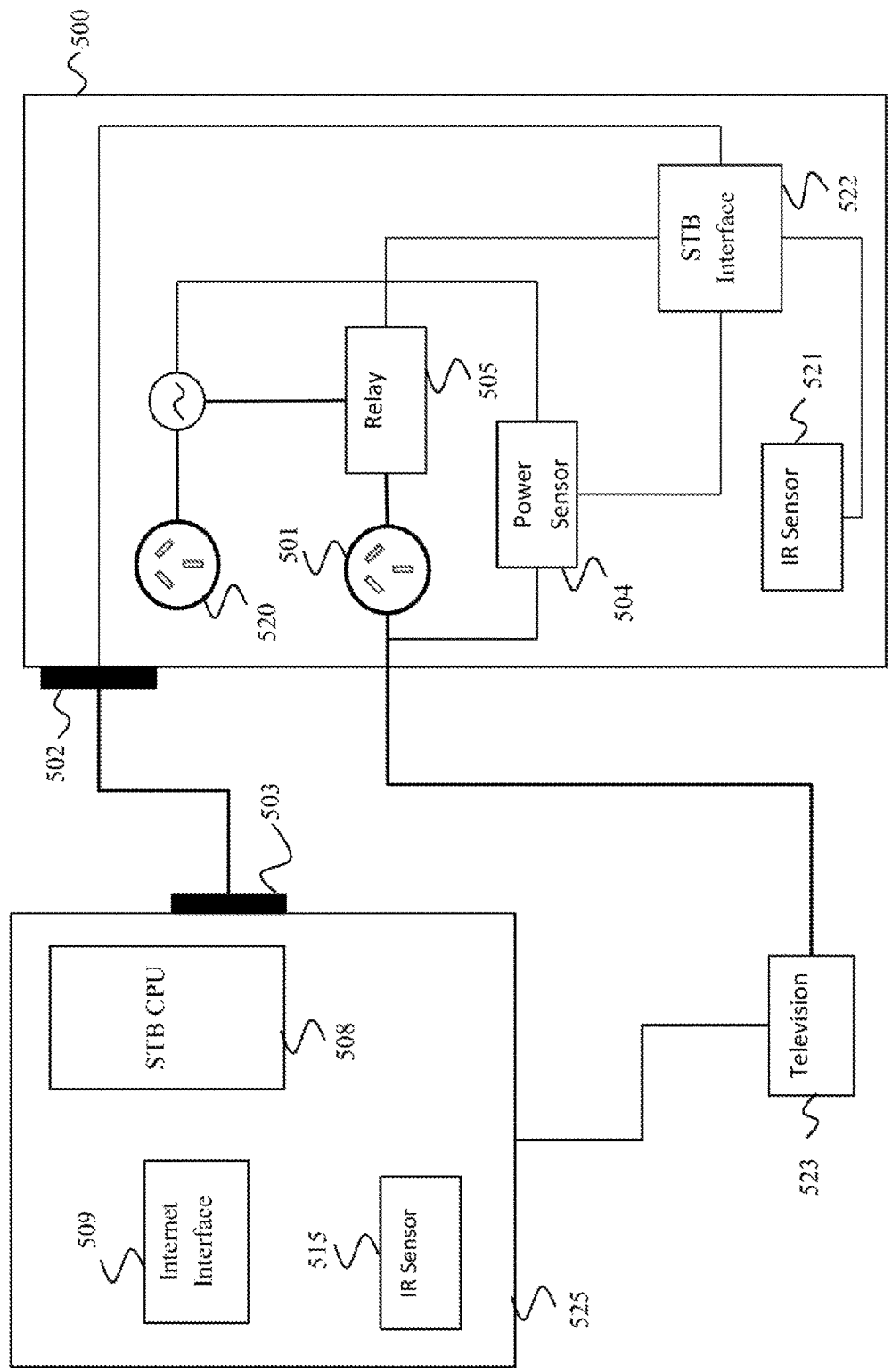
FIG. 5 is a block diagram representation of an embodiment of the current invention wherein the processing power of a set top box is utilised.

Referring to FIG. 5, there is shown a block diagram of an embodiment of the invention wherein the processing functions of the SPC are undertaken by a processor in the STB.

There is provided a basic SPC module 500, which houses the physical elements of the SPC.

SPC Module 500 may include Uncontrolled Outlet 520, which provided electrical power at all times when the SPC is plugged in. There is provided Controlled Outlet 501, where the electricity supply to this Controlled Outlet 501 is controlled by rely 505. The power drawn through Controlled Outlet 501 and optionally Uncontrolled Outlet 520 is monitored by power sensor 504.

There is provided an IR sensor 521 which detects usage of IR remote control devices. In the illustrated embodiment, this is provided in basic SPC module 500. A further remote control sensor, in the illustrated embodiment an IR sensor 515, is provided as part of the STB 525.

The SPC 500 further includes module connector 502. A module connector 503 is provided on the STB 525 which is adapted to connect to the module connector 502 on the SPC. These connectors provide data connection between the SPC 500 and the STB 525.

SPC 500 includes an STB Interface module 522, which provides two way data communication between the STB and the SPC. The data from power sensor 504 and IR sensor 521 are provided, via the STB Interface to the STB CPU 508. Data from the IR Sensor 515 is also provided to the STB CPU 508. In a preferred embodiment, this STB CPU is the CPU which controls all of the functions of the STB, the processor having been programmed to provide SPC analysis. In other embodiments it may be a dedicated processor located within the STB enclosure.

The STB CPU 508 analyses data from the STB Interface to determine when the devices connected to the Controlled Outlet 401 such as television 523 are in a low power standby state or an Active Standby state. When such a determination is made, the STB CPU 508 controls, via the STB Interface 522, relay 505 to remove the electricity supply from the Controlled Outlet 501.

All data connections shown or described as physical plug connections may also be provided as wireless connections, using any convenient protocol, including without limitation, Bluetooth, wi-fi, near field communication and Zigbee. Wireless communication may be provided with or without a physical connection between modules.

Where reference has been made to infra-red remote controls and corresponding infra-red sensors, it will be understood that any form of remote control and corresponding sensors, including, without limitation, radio frequency remote controls, may be employed.

Although the invention has been herein shown and described in what is conceived to be the most practical and preferred embodiments, it is recognised that departures can be made within the scope of the invention, which is not to be limited to the details described herein but is to be accorded the full scope of the disclosure so as to embrace any and all equivalent devices and apparatus.

The invention claimed is:

1. A standby power controller:
   a. receiving an electrical power from a power source to provide an output power to connected devices, the connected devices including a television,
   b. configured to:
      (1) determine whether the television is in use, and
      (2) remove the output power from the connected devices when the television is determined to be not in use,
   c. including a data communication link configured to communicate data between:
      (1) the standby power controller, and
      (2) a set top box connected to the television and co-located with the standby power controller,
   d. wherein the standby power controller receives first usage data from the set top box, the first usage data describing a usage state of the television.

2. The standby power controller of claim 1 wherein the standby power controller further includes a processor configured to determine the usage state of the television from the first usage data.

3. The standby power controller of claim 2 configured to remove the output power from the television when the usage state is determined to be active standby.

4. The standby power controller of claim 2 wherein a warning of impending withdrawal of the output power from the television is displayed on the television when the usage state of the television is determined to be active standby.

5. The standby power controller of claim 1 wherein:
   a. the set top box is configured to detect usage of a remote control configured to control at least one of:
      (1) the television, and
      (2) the set top box,
   b. the first usage data is at least partially derived from remote control usage detected by the set top box.

6. The standby power controller of claim 1 wherein the first usage data is at least partially derived from the presence or absence of the set top box's delivery of a video signal to the television.

7. The standby power controller of claim 1 wherein the standby power controller includes a remote control sensor configured to:
   a. detect usage of a remote control configured to control at least one of:
      (1) the television, and
      (2) the set top box; and
   b. output second usage data dependent on such remote control usage.

8. The standby power controller of claim 7 wherein the set top box is configured to:
   a. receive the second usage data, and
   b. command the standby power controller to perform the removal of the output power in dependence on the second usage data.

9. The standby power controller of claim 7 further including a processor configured to determine the usage state of the television from any one or more of:
   a. power consumption of the television,
   b. the first usage data, and
   c. the second usage data.

10. The standby power controller of claim 9 configured to remove the output power from the television when the usage state is determined to be active standby.

11. The standby power controller of claim 9 wherein a warning is displayed on the television when the usage state of the television is determined to be active standby.

12. The standby power controller of claim 1 wherein the standby power controller includes a power sensor configured to sense power consumption of the television.

13. The standby power controller of claim 1 wherein the output power is withdrawn from the set top box when the television is determined not to be in use.

14. The standby power controller of claim 1:
   a. configured to remove the output power from the television when the television is determined to be not in use,
   b. wherein a TV standby command is sent to the television before the standby power controller removes the output power from the television, the TV standby command being configured to cause the television to enter a low power standby state.

15. The standby power controller of claim 1 configured to:
   a. remove the output power from the television when the television is determined to be not in use,
   b. provide the output power to the television when indicia of user desire to use the television are present, and
   c. upon providing the output power to the television after a period during which the output power was removed from the television, providing a power activation command to the television, the power activation command being configured to instruct the television to enter a fully on power state.

16. A standby power controller:
   a. receiving an electrical power from a power source to provide an output power to connected devices, the connected devices including a television,
   b. configured to:
      (1) determine whether the television is in use, and
      (2) remove the output power from the connected devices when the television is determined to be not in use,
   c. wherein a TV standby command is sent to the television before the standby power controller removes power from the television, the TV standby command being configured to cause the television to enter a low power standby state.

17. The standby power controller of claim 16 wherein the TV standby command is a part of a HDMI protocol.

18. A standby power controller configured to:
   a. receive an electrical power from a power source to provide an output power to connected devices, the connected devices including a television,
   b. remove the output power from the connected devices when the television is determined to be not in use,
   c. provide the output power to the connected television when indicia of user desire to use the television are present, and
   d. upon providing the output power to the television after a period during which the output power was removed from the television, providing a power activation command to the television, the power activation command being configured to instruct the television to enter a fully on power state.

19. The standby power controller of claim 18 wherein the power activation command is a part of a HDMI protocol.

* * * * *